US012565791B2

(12) United States Patent
Cutrone

(10) Patent No.: US 12,565,791 B2
(45) Date of Patent: Mar. 3, 2026

(54) ERECTABLE COMPRESSION POSTS FOR TEMPORARY FENCING INSTALLATION

(71) Applicant: TOPS SCAFFOLD & SHORING SUPPLY LTD., Toronto (CA)

(72) Inventor: Mike Cutrone, Maple (CA)

(73) Assignee: TOPS SCAFFOLD & SHORING SUPPLY LTD., Toronto (CA)

( * ) Notice: Subject to any disclaimer, the term of this patent is extended or adjusted under 35 U.S.C. 154(b) by 309 days.

(21) Appl. No.: 18/317,607

(22) Filed: May 15, 2023

(65) Prior Publication Data

US 2024/0125142 A1 Apr. 18, 2024

(51) Int. Cl.
*E04H 17/22* (2006.01)
*E04H 17/16* (2006.01)
*F16B 2/24* (2006.01)
*F16B 7/14* (2006.01)
(Continued)

(52) U.S. Cl.
CPC ........... *E04H 17/22* (2013.01); *E04H 17/163* (2013.01); *F16B 2/246* (2013.01); *F16B 7/1454* (2013.01); *E04G 21/32* (2013.01); *E04G 2025/045* (2013.01)

(58) Field of Classification Search
CPC ... F16B 7/1454; F16B 2/246; E04G 2025/045
See application file for complete search history.

(56) References Cited

U.S. PATENT DOCUMENTS

| | | | | |
|---|---|---|---|---|
| 2,974,931 A | * | 3/1961 | Reel ........................... | B60P 7/15 |
| | | | | 410/151 |
| 5,913,783 A | * | 6/1999 | Weener ................... | E04G 25/08 |
| | | | | 52/651.1 |
| 8,002,229 B2 | | 8/2011 | Hewson | |

(Continued)

FOREIGN PATENT DOCUMENTS

| | | |
|---|---|---|
| CA | 142293 S | 4/2012 |
| CA | 2739414 A1 | 11/2012 |

(Continued)

OTHER PUBLICATIONS

Examination Report for Canadian application No. 3,159,031, CIPO, dated: Jun. 18, 2024.

(Continued)

*Primary Examiner* — Michael P Ferguson
(74) *Attorney, Agent, or Firm* — Bhole IP Law; Marc Lampert

(57) ABSTRACT

There is provided an erectable compression post for installing temporary fencing. The erectable compression post including: an upper portion positionable in engagement with a ceiling; a lower portion positionable in engagement with a floor, the upper portion moveable vertically within the lower portion; a fence retaining portion affixed to the upper portion or the lower portion; a compression assembly to bias the upper portion away from the lower portion; and a locking assembly to lock a position of the upper portion relative to the lower portion, the locking assembly including: a handle rotatably connected to the lower portion; and a tilting plate (Continued)

positioned around the upper portion and tiltable via urging by the handle to frictionally engage the upper portion to retain the upper portion relative to the lower portion.

13 Claims, 6 Drawing Sheets

(51) Int. Cl.
    *E04G 21/32*        (2006.01)
    *E04G 25/04*        (2006.01)

(56)             References Cited

U.S. PATENT DOCUMENTS

| | | | |
|---|---|---|---|
| 10,774,552 B2 * | 9/2020 | Klein | E04F 21/1833 |
| 2011/0042539 A1 | 2/2011 | Melic | |
| 2017/0159304 A1 | 6/2017 | Young | |

FOREIGN PATENT DOCUMENTS

| | | | | | |
|---|---|---|---|---|---|
| CA | 2475997 C | | 4/2013 | | |
| CA | 2824942 A1 | | 2/2014 | | |
| CA | 2515750 C | | 6/2014 | | |
| CA | 2803836 C | | 10/2014 | | |
| CA | 2914072 C | | 10/2016 | | |
| CA | 3110759 A1 | | 3/2020 | | |
| CA | 3060772 A1 | | 5/2020 | | |
| CA | 3043703 A1 | | 11/2020 | | |
| DE | 198 05 474 | * | 7/1999 | ............... | B60D 1/66 |
| EP | 3401466 A1 | | 11/2018 | | |
| GB | 1 230 843 | * | 5/1971 | | |

OTHER PUBLICATIONS

"Rapid compression post installation", Rapid EPS Edge Protection, YouTube. (May 24, 2016). https://www.youtube.com/watch?v= dmBGH-R_j4Y.
Examination Report for Canadian application No. 3,159,031, CIPO, dated: Nov. 27, 2023.

* cited by examiner

152

ERECTABLE COMPRESSION POSTS FOR TEMPORARY FENCING INSTALLATION

TECHNICAL FIELD

The following relates generally to temporary fencing, and more specifically, to an erectable compression post for installing temporary fencing.

BACKGROUND

In construction settings, fencing is often required to be installed in order to restrict access to certain portions of the construction area or as a safety measure in order to protect construction personnel from dangerous areas or falls.

SUMMARY

In an aspect, there is provided an erectable compression post for installing temporary fencing, the erectable compression post comprising: an upper portion positionable in engagement with a ceiling; a lower portion positionable in engagement with a floor, the upper portion moveable vertically within the lower portion; a fence retaining portion affixed to the upper portion or the lower portion; a compression assembly to bias the upper portion away from the lower portion; and a locking assembly to lock a position of the upper portion relative to the lower portion, the locking assembly comprising: a handle rotatably connected to the lower portion; and a tilting plate positioned around the upper portion and tiltable via urging by the handle to frictionally engage the upper portion to retain the upper portion relative to the lower portion.

In a particular case of the erectable compression post, the handle comprising a bushing on an upper end to cooperate with a lower surface of the tilting plate.

In another case of the erectable compression post, the locking assembly further comprises a C-shaped assembly affixed to the lower portion and extending over the upper portion, and a connecting assembly affixed to the lower portion on a side opposite the C-shaped assembly, the handle rotatably connected to the connecting assembly, the tilting plate positioned above the bushing and within the C-shaped assembly, wherein in a locking position, a lower end of the handle is rotated downwards such that the bushing urges the tilting plate upwards.

In yet another case of the erectable compression post, the locking assembly further comprises a locking pin insertable into holes defined in both the connecting assembly and the handle.

In yet another case of the erectable compression post, the handle is substantially perpendicular to the lower section when in the locked position.

In yet another case of the erectable compression post, the handle contacts an abutment when in the locked position, the abutment affixed to the lower portion.

In yet another case of the erectable compression post, the compression assembly comprises a spring located between the lower portion and the upper portion.

In another aspect, there is provided a locking assembly for an erectable compression post for installing temporary fencing, the erectable compression post comprising an upper portion positionable in engagement with a ceiling and a lower portion positionable in engagement with a floor, the upper portion moveable vertically within the lower portion, the locking assembly engageable to lock a position of the upper portion relative to the lower portion, the locking assembly comprising: a handle rotatably connected to the lower portion; and a tilting plate positioned around the upper portion and tiltable via urging by the handle to frictionally engage the upper portion to retain the upper portion relative to the lower portion.

In a particular case of the locking assembly, the handle comprising a bushing on an upper end to cooperate with a lower surface of the tilting plate.

In another case of the locking assembly, the locking assembly further comprising a C-shaped assembly affixed to the lower portion and extending over the upper portion, and a connecting assembly affixed to the lower portion on a side opposite the C-shaped assembly, the handle rotatably connected to the connecting assembly, the tilting plate positioned above the bushing and within the C-shaped assembly, wherein in a locking position, a lower end of the handle is rotated downwards such that the bushing urges the tilting plate upwards.

In yet another case of the locking assembly, the locking assembly further comprising a locking pin insertable into holes defined in both the connecting assembly and the handle.

In yet another case of the locking assembly, the handle is substantially perpendicular to the lower section when in the locked position.

In yet another case of the locking assembly, the handle contacts an abutment when in the locked position, the abutment affixed to the lower portion.

These and other aspects are contemplated and described herein. It will be appreciated that the foregoing summary sets out representative aspects of erectable posts to assist skilled readers in understanding the following detailed description.

DESCRIPTION OF THE DRAWINGS

A greater understanding of the embodiments will be had with reference to the Figures, in which.

DETAILED DESCRIPTION

Figure 1:
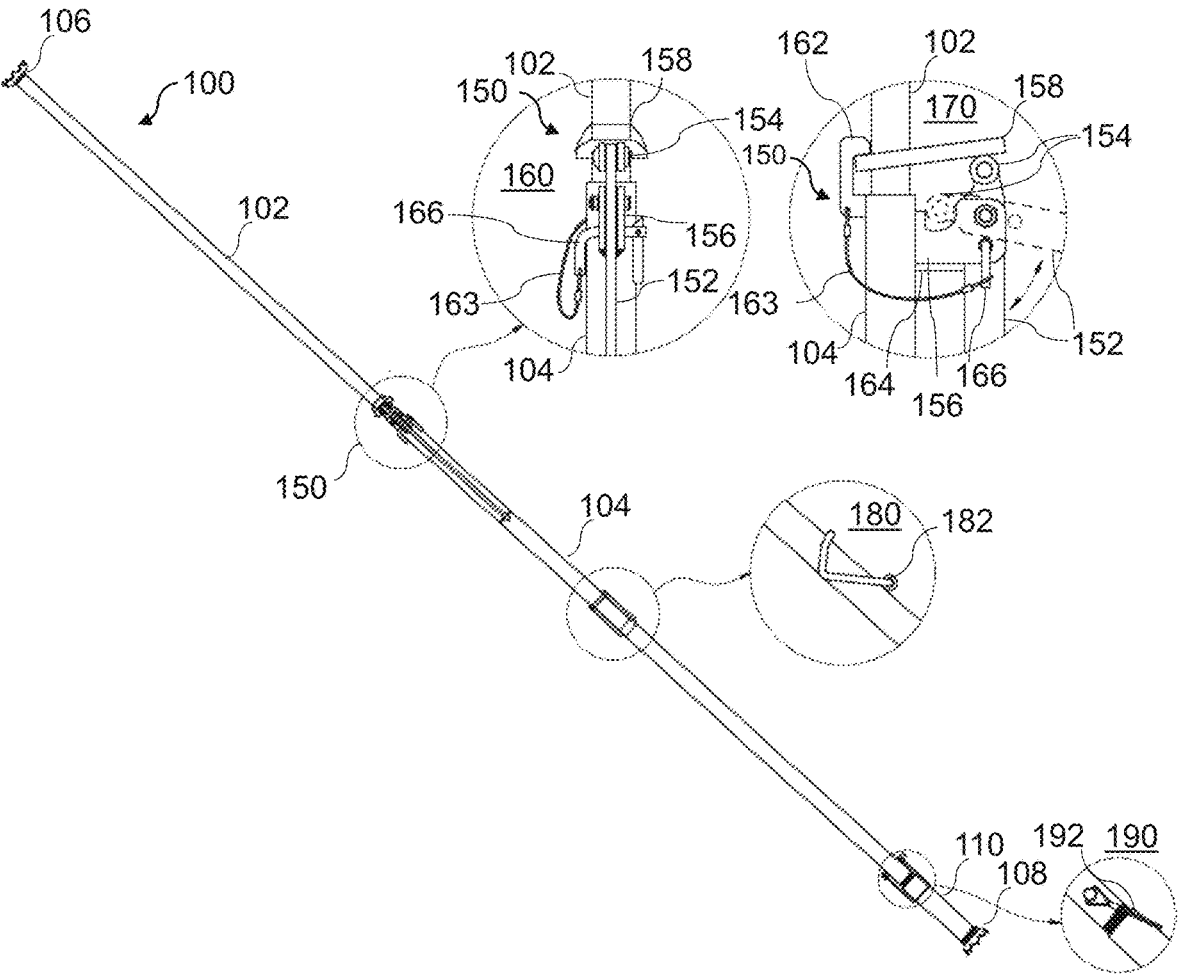
FIG. 1 illustrates a front view of an erectable compression post, according to an embodiment, with insets showing a front view and side view of a locking assembly and a side view of a fence clip assembly.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The following relates generally to temporary fencing, and more specifically, to an erectable compression post for installing temporary fencing. Illustrative embodiments of the posts disclosed herein will now be described in detail with reference to the figures.

FIG. 1 illustrates a front view of an erectable compression post 100. The erectable compression post 100 comprises an upper portion 102 slidably moveable with respect to a lower portion 104. The upper portion 102 includes an upper claw 106 for engaging with a ceiling of a room when the upper portion 102 is urged upwards, and the lower portion 104 includes a lower claw 108 for engaging with a floor of the room when the lower portion 104 is urged downwards. In some cases, the upper claw 106 and lower claw 104 can swivel. In other cases, any suitable shape or mechanism for the claws can be used to engage with the ceiling and floor respectively.

Figure 2:
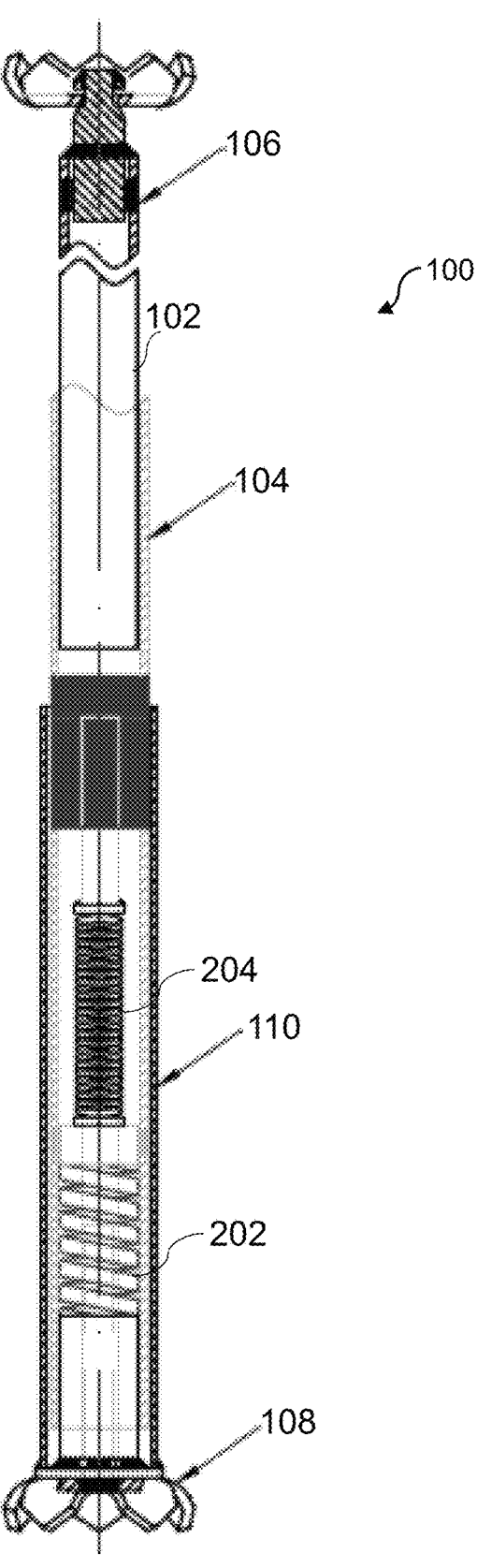
FIG. 2 illustrates a front partial-cutaway view of the erectable compression post of FIG. 1.
Figures 3A, 3B:
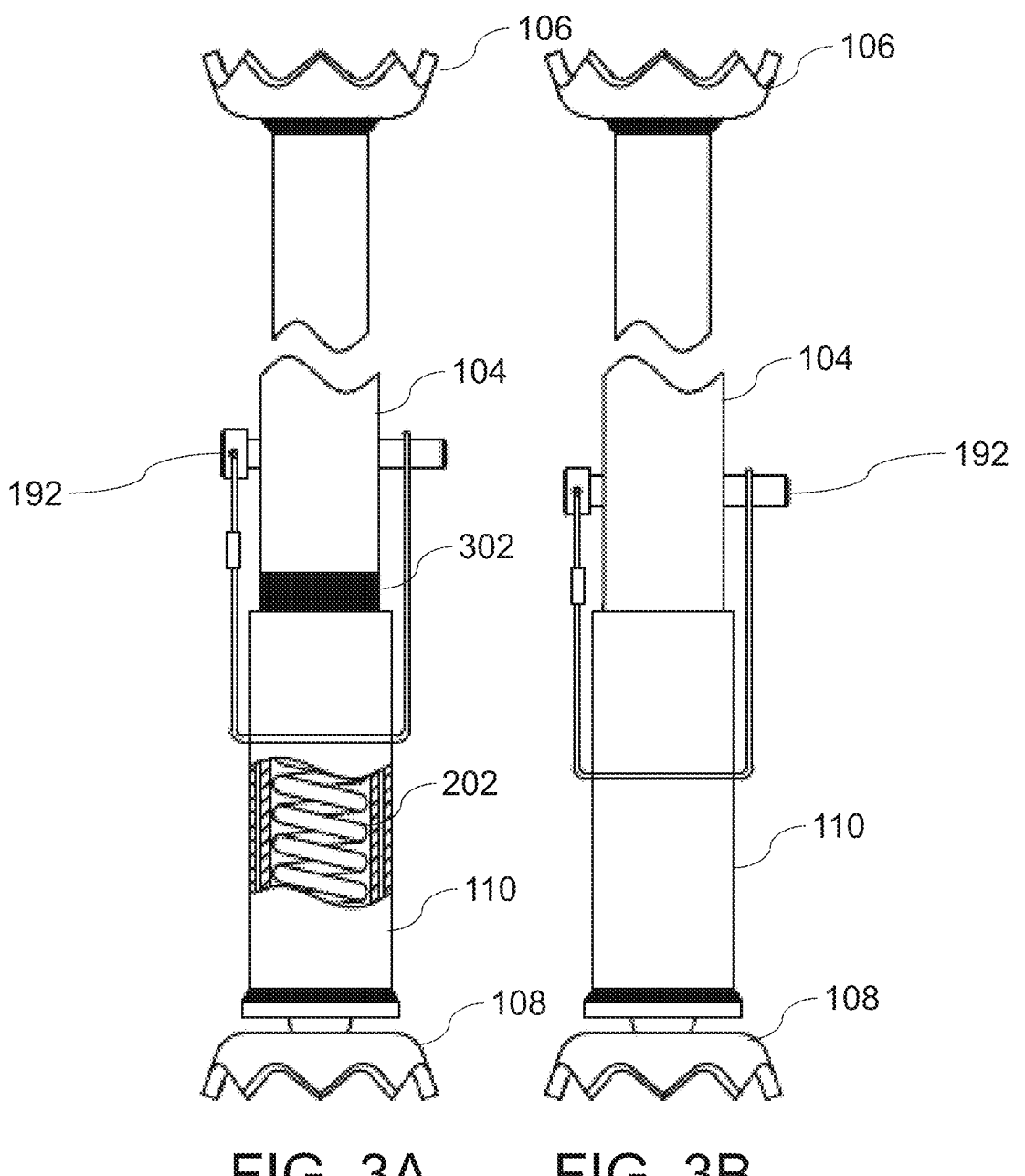
FIG. 3A illustrates a partial cross-sectional front view of the erectable compression post of FIG. 1 prior to installation
FIG. 3B illustrates a front view of the erectable compression post of FIG. 1 after installation.

The lower portion 104 includes a compression assembly 110. FIG. 2 illustrates a cross-sectional front view of the erectable compression post 100, FIG. 3A illustrates a partial cross-sectional front view of the erectable compression post 100, and FIG. 3B illustrates a front view of the erectable compression post 100. FIGS. 2 and 3A illustrate a spring 202 as part of the compression assembly 110. When the upper claw 106 is positioned in contact with the ceiling and the lower claw 108 is positioned in contact with the floor, the lower portion 104 can be turned such that a screw assembly 204 engages with a cooperating screw assembly in the compression assembly 110 to compress the spring 202. In this way, the compressed spring 202 exerts a force outward against the ceiling and the floor.

The erectable compression post 100 also includes a locking assembly 150 for securely confining the post 100 in place between the ceiling and floor. A front view inset 160 and a side view inset 170 of the locking assembly 150, in a locked position, are illustrated in FIG. 1.

The locking assembly 150 includes a handle 152 with a bushing 154 (or bearing) on an upper end. The lower end of the handle 152 is intended to be grasped by a user. The handle 152 is rotatably connected to a connecting assembly 156, which is attached near the top of the lower portion 104. A C-shaped assembly 162 is connected to the lower portion 104, on a side of the lower portion 104 that is opposite the connecting assembly 156. A tilting plate 158 has a space defined therein to be positioned around the upper portion 102. A first side of the tilting plate 158 is positioned within the space defined be the C-shaped assembly. An opposing second side of the tilting plate 158 is positioned above the bushing 154 such that the bushing 154 can roll along the underside of the tilting plate 158.

The inset views 160 and 170 show the handle 152 in the locked position, with the user urging the handle 152 downwards such until it is substantially parallel to the lower portion 104; in some cases, until it contacts an abutment 164 attached to the lower portion 104. In this position, the bushing 154 exerts an upward force on the second side of the tilting plate 158. Due to the first side being restricted from upward movement from the upper side of the C-shaped assembly 162, the upward force on the second side causes the tilting plate 158 to tilt upwards and the sides of the space of the tilting plate 158 frictionally engage the upper portion 102; causing the upper portion 102 to be locked in position relative to the lower portion 104. In some cases, a locking pin 166 can be inserted into lined-up holes defined by the connecting assembly 156 and the handle 154. In some cases, a cable 163 can be attached between the locking pin 166 and the C-shaped assembly 162 to retain the locking pin near the locking assembly 100 when the locking pin 166 is not inserted.

To disengage the locking assembly 150, the user removes the locking pin 166, if one is inserted, and rotates the handle 152 upwards and away from the lower portion 104. This position is illustrated in inset view 170 as dashed lines. In the unlocked position, the bushing 154 is rolled towards the upper portion 102 and no longer exerts and substantial tilting force of the tiling plate 158; thus, allowing the first portion 102 to freely move relative to the second portion 104.

The second portion also includes a fence retaining assembly 182. A side view inset 180 of the fence retaining assembly 182 is illustrated in FIG. 1. As known in the art, the fence clip assembly 182 retains a portion of a fence such that the fence is maintained upright and in position by one or more of the erectable compression posts 100.

Accordingly, in use, the user positions the upper claw 106 in contact with the ceiling of a room and the lower claw 108 in contact with the floor of the room. The compression assembly 110 produce a force to provisionally retain the erectable compression post 100 in place between the floor and the ceiling. The user then rotates the handle 152 downwards to lock the upper portion 102 relative to the lower portion 104. Advantageously, the upward force of the bushing will translate into a slight upward force of the tilting plate against the upper portion 102, prior to it completely locking in place, which causes an increased compression and tight fit of the erectable compression post 100 between the floor and the ceiling.

The components of the erectable compression post 100 can be made of any suitable material; for example metal, hard plastic, or the like. The handle 152, the claws 106, 108, and the fence retaining assembly 182 can have any suitable shape. In some cases, the fence retaining assembly 182 can be affixed to the upper portion 102 in addition to, or instead of, being affixed to the lower portion 102.

FIG. 3A illustrates the compression assembly 110 prior to installation and FIG. 3B illustrates the compression assembly 110 after installation. A portion 302 is highlighted for illustrative purposes to show the lower portion 104 being compressed into the compression assembly 110. The retaining pin 192 can be used to clip a base of the temporary fence in order to prevent wind uplift. It is understood that any suitable position can be used for these holes, and in some cases, more than one hole can be defined in the lower portion 104.

Figure 4:
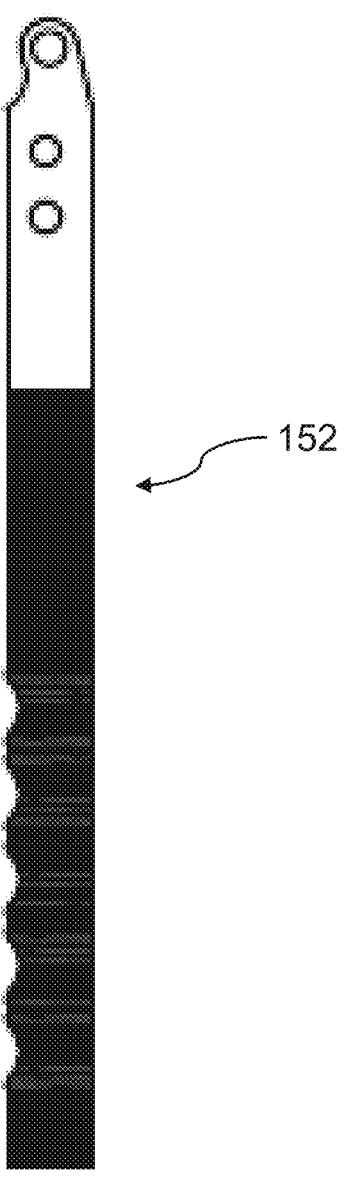
FIG. 4 illustrates an example side view of a handle for the erectable compression post of FIG. 1.

FIG. 4 illustrates an example of the handle 152 that can be used with the erectable compression post 100.

Figure 5:
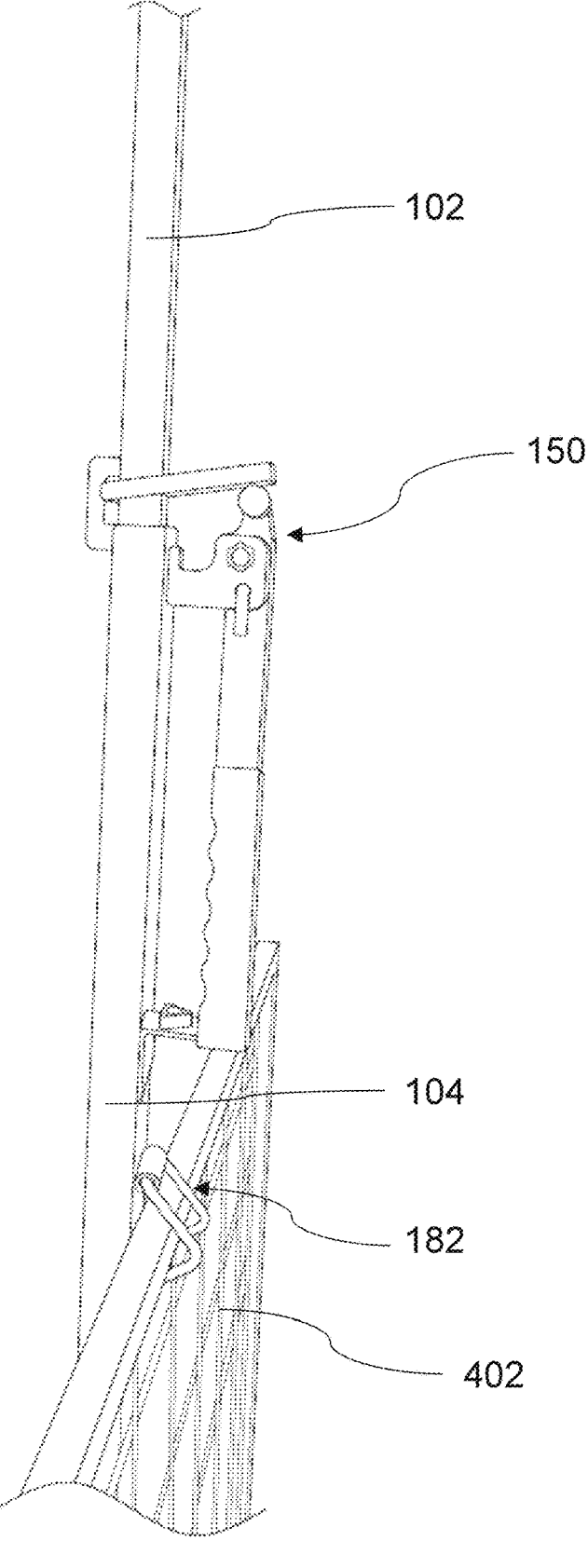
FIG. 5 illustrates a photograph side view of the erectable compression post of FIG. 1 retaining a temporary fence.
Figure 6:
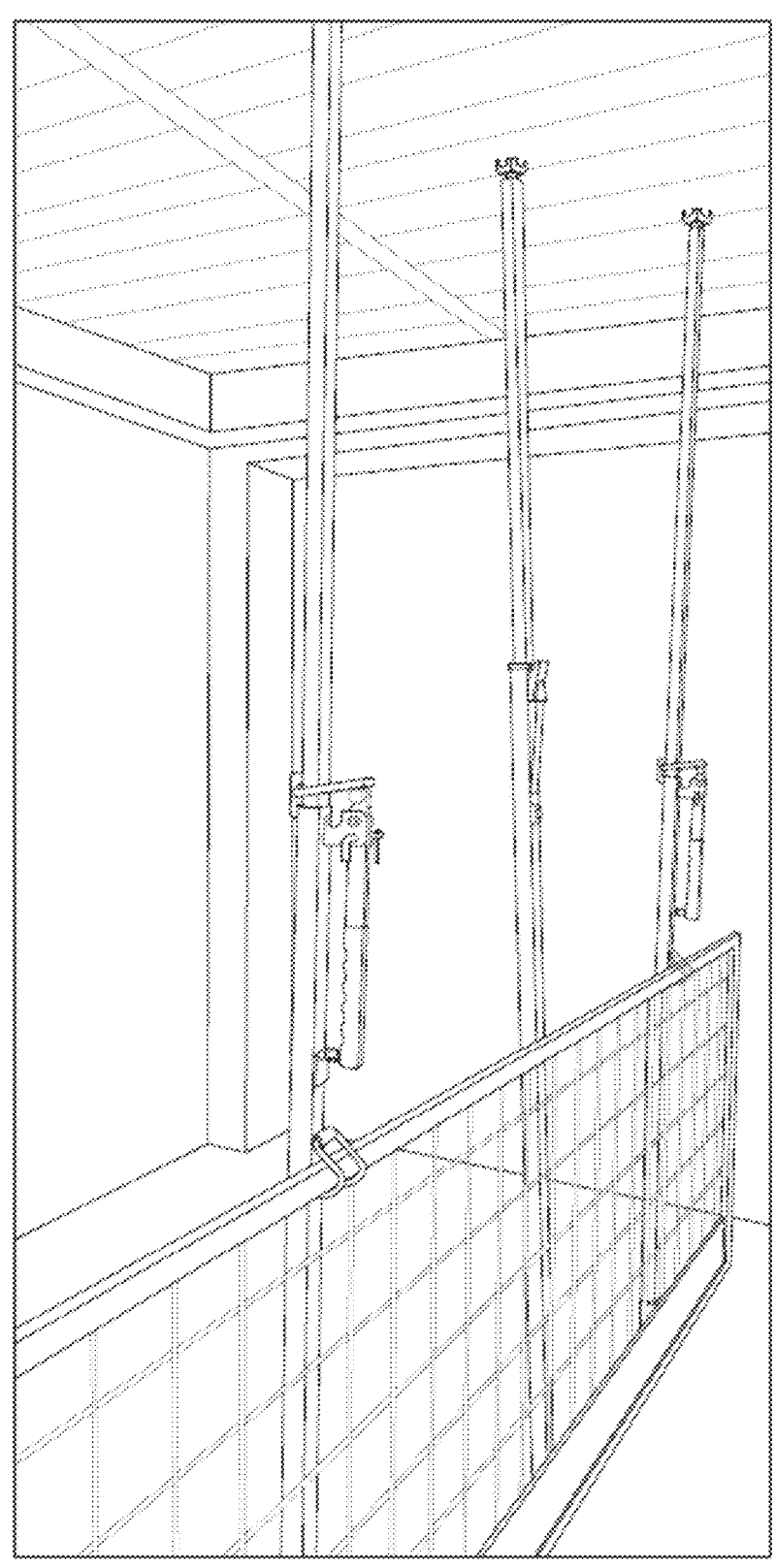
FIG. 6 illustrates a photograph of a plurality of the erectable compression posts of FIG. 1 retaining a temporary fence.

FIGS. 5 and 6 illustrate photographs of embodiments of the erectable compression post 100 used in practice to retain a temporary fence 402. As illustrated, the present embodiments provide a strong a durable approach to erecting a temporary fence, that is also relatively quick to install without requiring a lot of manual force/effort compared to other approaches. This is particularly advantageous for large construction sites where a large number of such posts have to be erected in a short amount of time.

Although the foregoing has been described with reference to certain specific embodiments, various modifications thereto will be apparent to those skilled in the art without departing from the spirit and scope of the invention as outlined in the appended claims.

The invention claimed is:

1. An erectable compression post for installing temporary fencing, the erectable compression post comprising:
   an upper portion positionable in engagement with a ceiling;
   a lower portion positionable in engagement with a floor, the upper portion moveable vertically within the lower portion;
   a fence retaining portion affixed to the upper portion or the lower portion;
   a compression assembly to bias the upper portion relative to the lower portion; and
   a locking assembly to lock a position of the upper portion relative to the lower portion, the locking assembly comprising:
      a handle rotatably connected to the lower portion at an intermediary location on the handle between upper and lower ends thereof, wherein the intermediary location on the handle defines a pivot axis which is fixed in location relative to the lower portion;
      a single tilting plate having a space defined therein to be positioned around the upper portion, wherein the tilting plate comprises a first side and an opposing second side, wherein the second side is movable relative to the upper portion such that the tilting plate is tiltable relative to the upper portion about the first side, and wherein the second side has a lower surface positioned above the upper end of the handle and detached therefrom; and
      a retaining member affixed to the lower portion, the retaining member comprising a retaining portion extending above the lower portion, the retaining portion defining a downward-facing surface,
      wherein, in a locking position, the first side of the tilting plate is in engagement with the downward-facing surface of the retaining member and the upper end of the handle is in engagement with the lower surface of the second side of the single tilting plate in a manner exerting an upward force on the second side, whereby the single tilting plate is tilted into frictional engagement with the upper portion to retain the upper portion relative to the lower portion.

2. The erectable compression post of claim 1, wherein the handle comprises a bushing on the upper end to rollingly engage the lower surface of the tilting plate.

3. The erectable compression post of claim 2, wherein the retaining member comprises a C-shaped assembly, and wherein the locking assembly further comprises a connecting assembly affixed to the lower portion on a side opposite the C-shaped assembly, the handle rotatably connected to the connecting assembly, the first side of the tilting plate located within the C-shaped assembly.

4. The erectable compression post of claim 3, wherein the locking assembly further comprises a locking pin insertable into holes defined in both the connecting assembly and the handle.

5. The erectable compression post of claim 3, wherein the handle is substantially parallel to the lower portion when in the locking position.

6. The erectable compression post of claim 3, wherein the handle contacts an abutment when in the locking position, the abutment affixed to the lower portion.

7. The erectable compression post of claim 1, wherein the compression assembly comprises a spring located between the lower portion and the upper portion.

8. A locking assembly of an erectable compression post for installing temporary fencing, the erectable compression post comprising an upper portion positionable in engagement with a ceiling and a lower portion positionable in engagement with a floor, the upper portion moveable vertically within the lower portion, the locking assembly engageable to lock a position of the upper portion relative to the lower portion, the locking assembly comprising:
   a handle rotatably connected to the lower portion at an intermediary location on the handle between upper and lower ends thereof, wherein the intermediary location on the handle defines a pivot axis which is fixed in location relative to the lower portion;
   a single tilting plate having a space defined therein to be positioned around the upper portion, wherein the tilting plate comprises a first side and an opposing second side, wherein the second side is movable relative to the upper portion such that the tilting plate is tiltable relative to the upper portion about the first side, and wherein the second side has a lower surface positioned above the upper end of the handle and detached therefrom; and
   a retaining member affixed to the lower portion, the retaining member comprising a retaining portion extending above the lower portion, the retaining portion defining a downward-facing surface,
   wherein, in a locking position, the first side of the tilting plate is in engagement with the downward-facing surface of the retaining member and the upper end of the handle is in engagement with the lower surface of the second side of the single tilting plate in a manner exerting an upward force on the second side, whereby the single tilting plate is tilted into frictional engagement with the upper portion to retain the upper portion relative to the lower portion.

9. The locking assembly of claim 8, wherein the handle comprises a bushing on the upper end to rollingly engage the lower surface of the tilting plate.

10. The locking assembly of claim 9, wherein the retaining member comprises a C-shaped assembly, and wherein the locking assembly further comprises a connecting assembly affixed to the lower portion on a side opposite the C-shaped assembly, the handle rotatably connected to the connecting assembly, the first side of the tilting plate located within the C-shaped assembly.

11. The locking assembly of claim 10, further comprising a locking pin insertable into holes defined in both the connecting assembly and the handle.

12. The locking assembly of claim 10, wherein the handle is substantially parallel to the lower portion when in the locking position.

13. The locking assembly of claim 10, wherein the handle contacts an abutment when in the locking position, the abutment affixed to the lower portion.

\* \* \* \* \*